United States Patent
Aljabri et al.

(10) Patent No.: US 12,196,849 B2
(45) Date of Patent: Jan. 14, 2025

(54) SYSTEM AND METHOD FOR CONTINOUS AND REAL-TIME LOCATING AND TRACKING SCRAPER USING UAV

(71) Applicant: SAUDI ARABIAN OIL COMPANY, Dhahran (SA)

(72) Inventors: Saeed Omar Aljabri, Al-Khobar (SA); Mohammed Naser Alsaraihi, Dammam (SA); Faris M. Alotaibi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 621 days.

(21) Appl. No.: 17/452,013

(22) Filed: Oct. 22, 2021

(65) Prior Publication Data

US 2023/0131412 A1  Apr. 27, 2023

(51) Int. Cl.
*G01S 13/88* (2006.01)
*F16L 55/48* (2006.01)
*G06V 20/17* (2022.01)
*G01V 3/12* (2006.01)

(52) U.S. Cl.
CPC ............ *G01S 13/885* (2013.01); *F16L 55/48* (2013.01); *G06V 20/17* (2022.01); *G01V 3/12* (2013.01)

(58) Field of Classification Search
CPC ........ G01S 13/885; F16L 55/48; G06V 20/17; G01V 3/12
See application file for complete search history.

(56) References Cited

U.S. PATENT DOCUMENTS

| | | | |
|---|---|---|---|
| 4,590,799 A | 5/1986 | Brown et al. | |
| 6,553,322 B1 * | 4/2003 | Ignagni | F16L 55/48 |
| | | | 701/472 |
| 6,590,519 B2 * | 7/2003 | Miceli | G01S 13/89 |
| | | | 701/472 |
| 6,965,320 B1 | 11/2005 | Casey et al. | |
| 7,222,549 B2 | 5/2007 | Abney | |
| 9,897,243 B2 | 2/2018 | Giunta et al. | |
| 10,895,637 B1 * | 1/2021 | Padmanabhan | G01S 19/14 |

OTHER PUBLICATIONS

Annan, A. P., "Ground Penetrating Radar Principles, Procedures & Applications"; Sensors & Software Incorporated; pp. i-278; 2003 (286 pages).

* cited by examiner

*Primary Examiner* — Matthew M Barker
(74) *Attorney, Agent, or Firm* — Osha Bergman Watanabe & Burton LLP (57) ABSTRACT

A method includes: launching an unmanned aerial vehicle (UAV) parallel to a buried pipeline; sending a plurality of transmitted ground penetrating radar (GPR) waves to the buried pipeline using a GPR antenna of the UAV; receiving a received GPR wave from the buried pipeline such that the received GPR wave is a combination of a reflected GPR wave with a ringing noise signal from the one or more scrapers; measuring one or more parameters of the received GPR wave and determining if values of the one or more parameters are within a predefined threshold region; recording location coordinates and a time stamp of the one or more scrapers by analyzing the received GPR wave; and sending the location coordinates and the time stamp of the one or more scrapers to a controller unit for continuous and real-time locating and tracking movement of the one or more scrapers.

20 Claims, 6 Drawing Sheets

SYSTEM AND METHOD FOR CONTINOUS AND REAL-TIME LOCATING AND TRACKING SCRAPER USING UAV

BACKGROUND

Pipeline scrapers are periodically (more often in the summer than in the winter) introduced into pipelines to be conveyed, along with the transported fluid, through the pipeline from one pump station to the next. These scrapers (sometimes called "pigs") serve to remove coatings of paraffin and other undesirable material from the inner walls of the buried pipeline in order to maintain its capacity and efficiency. It is notoriously well understood, by those skilled in the art, that, upon reaching an exit position, the scraper is remarkably messy and, as such, is difficult and disagreeable to handle. Accumulated material adhered on the buried pipeline internal wall can obstruct passage of the scraper. This produces a stick-slip motion of the scraper in the areas where its mobility is reduced. In some cases, the inside pipeline diameter contour loses circularity, heavily increasing the drag forces acting on the scraper. The scraper reduces speed and is eventually stopped. In other cases, the operating pressure, when launching and pushing the scraper through the buried pipeline, may drop to undesirable levels at certain points along the buried pipeline causing the scraper to get stuck or lose momentum. However, such events might lead to multiple issues, for example, the various changes in scraper speed while it travels along the pipeline make it difficult to detect and locate by pressure monitoring systems, or other flowrate and pressure drop modeling systems.

The current methodology involves sending an operator crew to the pipeline to locate the scraper manually using above ground marker. The current process is time consuming and requires specialized and trained manpower to locate the scrapper through enormously long and complex network of pipelines that cross remote locations in desert. In addition, the manual process is not estimating a speed of the scraper. Accordingly, there is a need of an efficient system and method to locate and track the movement of the scraper in the buried pipeline with a proactive approach for controlling the speed of the scraper to prevent any stuck condition and in order to ensure a safe arrival of the scraper at a receiver facility.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for continuous and real-time locating and tracking movement of the one or more scrapers in the buried pipeline. The method includes: (a) launching, using a computer processor, an unmanned aerial vehicle (UAV) parallel to a buried pipeline; (b) sending, using the computer processor, a plurality of transmitted ground penetrating radar (GPR) waves to the buried pipeline using a GPR antenna of the UAV; (c) receiving, using the computer processor, a received GPR wave from the buried pipeline with one or more scrapers, wherein the received GPR wave is a combination of a reflected GPR wave with a ringing noise signal from the one or more scrapers; (d) measuring, using the computer processor, one or more parameters of the received GPR wave; (e) determining, using the computer processor, if values of the one or more parameters of the received GPR wave are within a predefined threshold region; (f) recording, using the computer processor, location coordinates of the one or more scrapers and a time stamp of the one or more scrapers by analyzing the one or more parameters of the received GPR wave if the values of the one or more parameters of the received GPR wave are within the predefined threshold region; and (g) sending the location coordinates and the time stamp of the one or more scrapers, using the computer processor, to a controller unit for continuous and real-time locating and tracking movement of the one or more scrapers in the buried pipeline. If the buried pipeline is a metallic pipeline, steps (a)-(e) are repeated until the values of the one or more parameters of the received GPR wave are within the predefined threshold region. If the buried pipeline is a non-metallic pipeline, the received GPR wave penetrating a wall of the non-metallic pipeline and hitting the one or more scrapers is analyzed for the continuous and real-time locating and tracking movement of the one or more scrapers.

In another aspect, embodiments disclosed herein generally relate to a system that includes a buried pipeline with one or more scrapers, an unmanned aerial vehicle (UAV) system, and a reservoir simulator. The UAV system further includes an UAV and a controller unit coupled to the UAV. The UAV further includes a ground penetrating radar (GPR) antenna, a global positioning system (GPS), a signal processing module coupled to a database, a communication module, a control system, and a velocity controller. The reservoir simulator is operatively connected to the controller unit and includes a computer processor which executes a method for continuous and real-time locating and tracking movement of the one or more scarpers in the buried pipeline. The reservoir simulator: (a) launches an unmanned aerial vehicle (UAV) parallel to a buried pipeline; (b) sends a plurality of transmitted ground penetrating radar (GPR) waves to the buried pipeline using a GPR antenna of the UAV; (c) receives a received GPR wave from the buried pipeline with one or more scrapers, wherein the received GPR wave is a combination of a reflected GPR wave with a ringing noise signal from the one or more scrapers; (d) measures one or more parameters of the received GPR wave; (e) determining if values of the one or more parameters of the received GPR wave are within a predefined threshold region; (f) records location coordinates of the one or more scrapers and a time stamp of the one or more scrapers by analyzing the one or more parameters of the received GPR wave if the values of the one or more parameters of the received GPR wave are within the predefined threshold region; and (g) sends the location coordinates and the time stamp of the one or more scrapers to a controller unit for continuous and real-time locating and tracking movement of the one or more scrapers in the buried pipeline. If the buried pipeline is a metallic pipeline, steps (a)-(e) are repeated until the values of the one or more parameters of the received GPR wave are within the predefined threshold region. If the buried pipeline is a non-metallic pipeline, the received GPR wave penetrating a wall of the non-metallic pipeline and hitting the one or more scrapers is analyzed for the continuous and real-time locating and tracking movement of the one or more scrapers.

In another aspect, embodiments disclosed herein generally relate to a non-transitory computer readable medium storing instruction. The instructions are executable by a computer processor and include functionality for: (a) launching an unmanned aerial vehicle (UAV) parallel to a buried pipeline; (b) sending a plurality of transmitted ground penetrating radar (GPR) waves to the buried pipeline using a GPR antenna of the UAV; (c) receiving a received GPR wave from the buried pipeline with one or more scrapers, wherein the received GPR wave is a combination of a reflected GPR wave with a ringing noise signal from the one or more scrapers; (d) measuring one or more parameters of the received GPR wave; (e) determining if values of the one or more parameters of the received GPR wave are within a predefined threshold region; (f) recording location coordinates of the one or more scrapers and a time stamp of the one or more scrapers by analyzing the one or more parameters of the received GPR wave if the values of the one or more parameters of the received GPR wave are within the predefined threshold region; and (g) sending the location coordinates and the time stamp of the one or more scrapers to a controller unit for continuous and real-time locating and tracking movement of the one or more scrapers in the buried pipeline. If the buried pipeline is a metallic pipeline, steps (a)-(e) are repeated until the values of the one or more parameters of the received GPR wave are within the predefined threshold region. If the buried pipeline is a non-metallic pipeline, the received GPR wave penetrating a wall of the non-metallic pipeline and hitting the one or more scrapers is analyzed for the continuous and real-time locating and tracking movement of the one or more scrapers.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope of the invention should not be considered limited to the specific arrangement of steps shown in the flowcharts.

Although multiply dependent claims are not introduced, it would be apparent to one of ordinary skill that the subject matter of the dependent claims of one or more embodiments may be combined with other dependent claims.

In general, one or more embodiments disclosed herein are directed to a system and a method for real-time locating and tracking movement of one or more scrapers in a buried pipeline in order to ensure a safe arrival of the scrapers at the receiver facility. In particular, embodiments disclosed herein may implement the system comprising an unmanned aerial vehicle (UAV) which includes an airframe structure having a ground penetrating radar (GPR) antenna. The GPR antenna transmits electromagnetic GPR waves to underground for targeting the buried pipelines. A received GPR wave from the buried pipelines may be reflected due to a soil-pipelines interface and may be affected by a noise signal generated by a magnetic transmitter of the scraper. When electrons of a metal layer of the buried pipeline are excited by the transmitted GPR waves, a phenomenon called noise ringing is generated and detected by the GPR antenna. However, when the metal layer of the buried pipelines being magnetized due to the magnetic transmitter of the scraper, an amplitude and a frequency of the received ringing noise signal may be different as compared to a non-magnetized buried pipeline without any scraper. The UAV may process the received GPR wave and analyze the amplitude and frequency of the received GPR wave to locate and track the scraper. A global positioning system (GPS) of the UAV may record the determined location and the determined time-stamp and send it to a controller unit of the UAV. The embodiments disclosed herein may also be used to calculate velocity of the scraper by recording several locations of the scraper with time stamps from the GPS of the UAV.

Other embodiments may provide the real-time locating and tracking movement of the scraper in non-metallic buried pipelines. In particular, the reflected signals from the scraper are analyzed for detecting the scraper which may pass a non-metallic body of the buried pipelines. If the scraper is not equipped with the second EM sensor, then the detection of the scraper may be based on analyzing the amplitude and a shape of the received GPR wave which may have a different signature as compared to the received GPR wave due to a media filling the buried pipeline.

Embodiments of the invention may be used to diminish the risk involved due to various desert dangers on manpower and reduce the enormous man hours and tedious efforts required to locate and track scrapper inside the buried pipelines.

Figure 1:
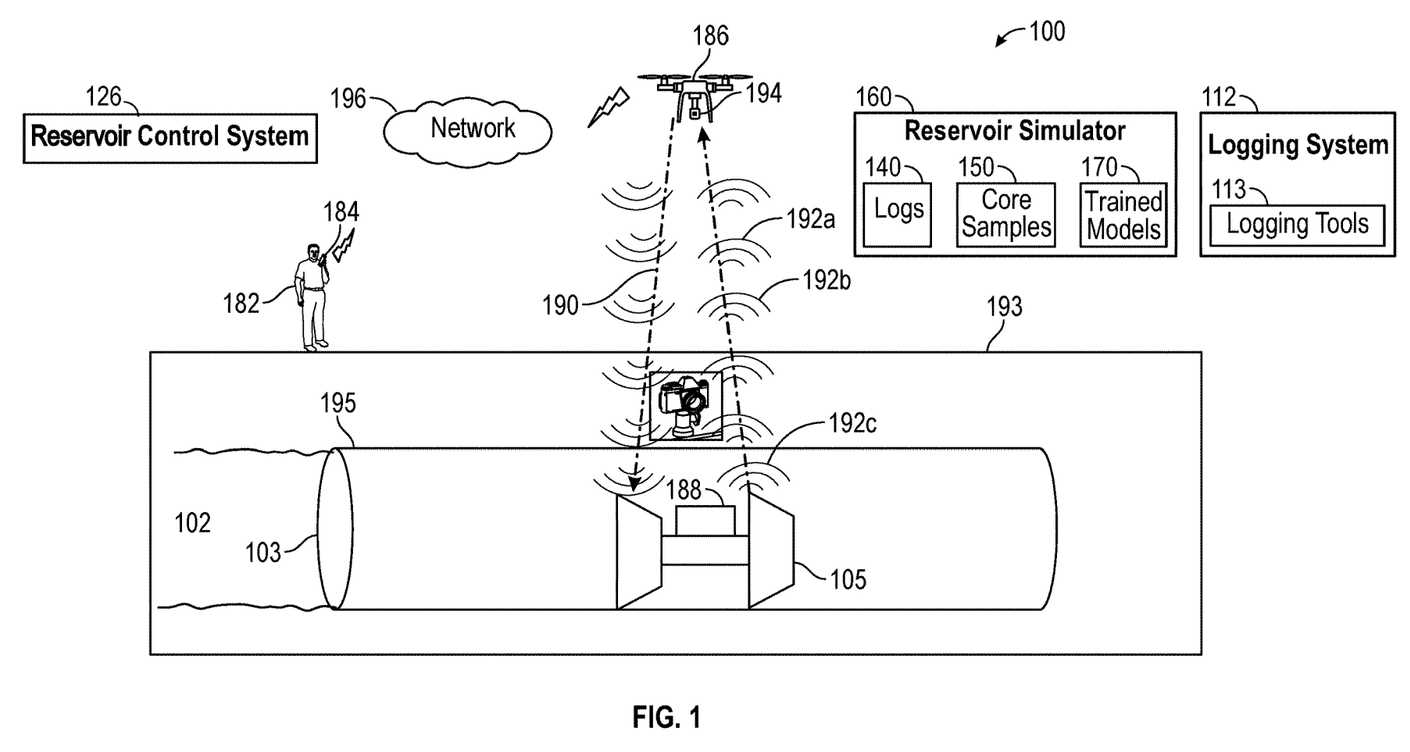
FIG. 1 shows exemplary system diagram in accordance with one or more embodiments.

FIG. 1 shows a system diagram in accordance with one or more embodiments. More specifically, FIG. 1 illustrates an UAV environment (100) near a reservoir (102) and the buried pipeline (103) in which the real-time locating and tracking movement of one or more scrapers (105) may be implemented. In particular, the UAV environment (100) includes an operator (182), an UAV system (186) with a controller unit (184), and the scraper (105) in the buried pipeline (103). The reservoir (102) may further connect one or more pipelines ("buried pipeline") (103).

The buried pipeline (103) is one of the main elements of the oil and gas infrastructure. It acts as the main transportation system for all kinds of energy products, natural gas, biofuels, and liquid petroleum. There are two main types of materials in which the pipelines (103) are made of metal, such as steel, or non-metal, such as plastic. Both kinds of pipelines (103) serve the same purpose, however, steel pipelines are the type commonly used worldwide. The pipelines (103) serve three main purposes: gathering lines, which bring crude oil or natural gas from nearby wells to a treatment plant or processing facility, transportation pipelines that transit the outcome products like oil, gas and refined product between cities or countries, and distribution pipelines which convey the products to the end users.

The buried pipeline (103) may further include one or more scrapers ("scraper") (105). The scraper is also known as pigs and is a piece of pipeline where elastomer discs are attached radially at various points along the buried pipeline (103). The elastomer discs of the scraper slide along the internal wall of the buried pipeline (103) and remove the adhered corrosion and other undesired substances.

The UAV environment (100) may include a logging system (112). The logging system (112) may include one or more logging tools (113), such as the NMR logging tool or a resistivity logging tool, for use in generating data. The plot of the logging measurements versus depth may be referred to as a "log." The logs may provide depth measurements that describe such reservoir characteristics as formation porosity, formation permeability, resistivity, water saturation, and the like. The resulting logging measurements may be stored or processed or both.

In some embodiments, the control system (126) may control various operations of the UAV environment (100), such as production operations, completion operations, maintenance operations, and reservoir monitoring, assessment, and development operations. The control system (126) may include hardware or software for managing operations or maintenance operations. For example, the control system (126) may include one or more programmable logic controllers (PLCs) that include hardware or software with functionality to control one or more processes. In particular, a programmable logic controller may be a ruggedized computer system with functionality to withstand vibrations, extreme temperatures (for example, ~575° C.), wet conditions, or dusty conditions, for example, around the UAV environment (100). Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress. In some embodiments, the control system (126) includes a computer system that is the same as or similar to that of computer system (500) described below in FIGS. 5A and 5B and the accompanying description.

In some embodiments, sensors may be included in the control system (126) that includes a processor, memory, and an analog-to-digital converter for processing sensor measurements. For example, the sensors may include acoustic sensors, such as accelerometers, measurement microphones, contact microphones, and hydrophones. Likewise, the sensors may include other types of sensors, such as transmitters and receivers to measure resistivity or gamma ray detectors. The sensors may include hardware or software or both for generating different types of logs (such as acoustic logs or sonic logs) that may provide data the UAV environment (100). If such data is acquired, for example, during drilling operations (that is, logging-while-drilling), then the information may be used to adjust drilling operations in real-time. Such adjustments may include rate of penetration (ROP), drilling direction, and altering mud weight.

In some embodiments, the measurements are recorded in real-time, and are available for review or use within seconds, minutes or hours of the condition being sensed (for example the measurements are available within 1 hour of the condition being sensed). In such an embodiment, the data (135) may be referred to as "real-time" data (135). Real-time operator makes real-time decisions regarding development of the reservoir (102), such as on-demand adjustments in regulation of production.

In some embodiments, the control system (126) through the logging system (112) collects and records data and may generate datasets of dynamic data based on the collected data.

In some embodiments, the reservoir simulator (160) includes hardware and/or software with functionality for analyzing log data and/or performing one or more reservoir simulations. For example, the reservoir simulator (160) may store logs and data regarding core samples for performing simulations. The reservoir simulator (160) may further analyze the log data, the core sample data, seismic data, and/or other types of data to generate and/or update the one or more reservoir models. While the reservoir simulator (160) is shown at the UAV environment (100), embodiments are contemplated where reservoir simulators are located away from the UAV environment (100). The reservoir simulator (160) may include hardware or software with functionality for generating one or more trained models regarding the UAV environment (100). For example, the reservoir simulator (160) may store logs (140) and data regarding core samples (150), and further analyze the log data, the core sample data, seismic data, or other types of data to generate or update the one or more trained models (170) having a complex geological environment. For example, different types of models may be trained, such as machine learning, artificial intelligence, convolutional neural networks, deep neural networks, support vector machines, decision trees, inductive learning models, deductive learning models, and supervised learning models, and are capable of approximating solutions of complex non-linear problems. The reservoir simulator (160) may couple to the logging system (112) and the drilling system (not shown).

In some embodiments, the reservoir simulator (160) may include functionality for applying machine learning and deep learning methodologies to precisely determine various subsurface layers. To do so, a large amount of interpreted data may be used to train a model. To obtain this amount of data, the reservoir simulator (160) may augment acquired data for various geological scenarios and drilling situations. For example, drilling logs may provide similar log signatures for a particular subsurface layer except where a well encounters abnormal cases. Such abnormal cases may include, for example, changes in subsurface geological compositions, well placement of artificial materials, or various subsurface mechanical factors that may affect logging tools. As such, the amount of data with abnormal cases available to the reservoir simulator (160) may be insufficient for training a model. Therefore, in some embodiments, the reservoir simulator (160) may use data augmentation to generate a dataset that combines original acquired data with augmented data based on geological and drilling factors. This supplemented dataset may provide sufficient training data to train a model accordingly.

In some embodiments, the reservoir simulator (160) is implemented in a software platform for the reservoir control system (126). The software platform may obtain data acquired by either the drilling system (not shown) or the logging system (112) as inputs, which may include multiple data types from multiple sources. The software platform may aggregate the data from these systems (112) in real time for rapid analysis. Real-time of or relating to computer systems in the software platform is defined as the actual time for updating information with instantaneous processing at the same rate as required by a user or necessitated by a process being controlled. In some embodiments, the control system (126), the logging system (112), or the reservoir simulator (160) may include a computer system that is similar to the computer system (500) described with regard to FIGS. 5A and 5B and the accompanying description.

The UAV system (186) described herein may be operated autonomously (for example by a suitable computing system such as the controller unit (184)), semi-autonomously, or manually (for example by the operator (182)). The UAV system (186) may receive commands from a suitable entity (for example, the operator (182) or autonomous controller unit (184)) and respond to such commands by performing one or more actions. For example, the UAV system (186) may be controlled to take off an UAV having an airframe structure and including a GPR antenna (194), from the ground, move within the air (for example, with up to three degrees of freedom in translation and up to three degrees of freedom in rotation), hover within the air, land on the ground, and so on. As another example, the UAV may be controlled to move at a specified velocity and/or acceleration (for example, with up to three degrees of freedom in translation and up to three degrees of freedom in rotation). The UAV may have a maximum horizontal velocity of approximately 13 m/s, or within a range from 10 m/s to 15 m/s. The UAV may have a maximum vertical velocity of approximately 6 m/s, or within a range from 5 m/s to 10 m/s. The UAV may have a maximum translational acceleration of approximately 6.8 m/s$^2$, or within a range from 5 m/s$^2$ to 10 m/s$^2$. In some embodiments, translational acceleration of the UAV may cause the UAV to assume a corresponding attitude. Accordingly, the maximum translational acceleration of the UAV may be constrained by the maximum attitude. In some embodiments, the maximum attitude angle for the UAV (relative to the vertical axis of the UAV) may be approximately 35°, or within a range from 25° to 45°.

The embodiment disclosed herein is showing the buried pipeline (103) with a metal layer (195). In some embodiments, the buried pipeline (103) may have a non-metal layer. In general, the main types of metal steel pipelines mostly used in the oil and gas industry are carbon steel, killed carbon, alloy steel and stainless steel. The main differences between each type depend on the traces of elements within each type and the temperature, pressure, and corrosion conditions where they would be placed. The non-metal "plastic" pipelines are characterized by corrosion resistance, light weight, and is commonly used in moderate temperature and pressure applications. The most popular types of the non-metal plastic pipelines are polyethylene, polypropylene, unplasticized polyvinyl chloride (UPVC), and high-density polyethylene (HDPE). The non-metal plastic pipelines provide a corrosive-resistant pipe for oil and gas applications with the strength for replacing steel pipelines in low- and medium-pressure circumstances. Even though metal steel pipelines are still the main type of pipelines widely used worldwide and may still be the first choice for oil and gas companies, plastic pipelines are starting to be favorable to the oil and gas field operators within the applicable environments.

There are many elements to be considered while building the infrastructure of the buried pipelines (103) within the oil and gas industry, the geographical and environmental conditions including the temperature and pressure where the buried pipelines (103) would be placed, type of fluids that the buried pipelines (103) carry, the means of transportation to be used, the financial capabilities of the oil and gas company and its budget for the planned projects, the lifespan of the buried pipelines that ensures the sustainability of the project without the need for replacement.

In particular, the metal buried pipelines have the ability to withstand low and high pressure and temperature ranges. They can survive a pressure range from 30 up to 40 bars and temperature ranges up to up to 100° C., while the non-metal plastic pipelines have a lower tolerance to higher pressure and temperature in comparison to its metal alternatives. The metal steel pipelines are suitable for both hot and wet applications such as river crossings and rough terrain but the most significant disadvantage of the steel pipelines is corrosion; external corrosion affects both the buried pipelines and above-ground pipelines. Internal corrosion of steel pipelines is a major dilemma in the oil and gas sector due to the high level of environmental costs and repercussions of spillage of the oil.

Meanwhile, using the non-metal pipelines like HDPE can avoid the corrosion issue in the first place as it is rustproof, break-resistant, and corrosion-free. The water leakage percentage is zero. The plastic pipelines are also known for their flexible nature: Gas distribution systems are capable of surviving severe ground shifts, especially from earthquakes, when they are made from fused PE pipelines.

Metal pipelines has higher strength when compared to plastic pipelines which have lower strength since the support span for these pipelines is not relatively high, which may lead to the placing of additional civil structure for proper support of these pipelines. The metal steel pipelines have excellent benefits including excellent stress crack resistance to natural gas and its contaminants, low permeation to methane and hydrogen, high hydrostatic design basis rating at 20° C., 60° C. and 80° C., superior impact resistance, squeeze off, and dependable ultraviolet (UV) performance for outside storage.

The non-metal plastic pipelines cannot replace the metal steel pipelines in higher temperature and pressure environments but can work efficiently within medium and low temperature and pressure providing an alternative for the operators of the metal pipelines struggling with issues like corrosion. The metal pipelines provide a great range of benefits due to higher strength and flexibility and ability to withstand higher pressure and temperature while non-metal pipelines have the advantage of the corrosion resistance, light weight, cost reduction and long-term sustainable advantage that may enhance the strength of the oil and gas infrastructure of the oil and gas corporation.

Turning to FIG. 1, in some embodiment, the GPR antenna (194) of the UAV system (186) may transmit a plurality of electromagnetic "transmitted GPR wave" (190) to a soil-pipeline interface (193) for targeting the buried pipeline (103). A received GPR wave (192a) from the buried pipeline (103) may be reflected due to the soil-pipelines interface (193) and may be affected by a noise signal generated by a magnetic transmitter (188) of the scraper (105). In particular, the received GPR wave (192a) from the scraper (105) is a combination of a reflected GPR wave (192b) with a ringing noise signal (192c) from the scraper (105). The magnetic transmitter (188) may send magnetic flux leakage (MFL) or electromagnetic acoustic transducer (EMAT) signals as the noise signal. During the MFL, a magnetic flux is induced between two poles of a magnet and the buried pipeline (103) wall is saturated with this flux. The magnetic flux leakage is monitored by sensors. If the steel is homogeneous and free from any defect, the leakage of flux is uniform. Any loss of wall thickness (for example, due to corrosion) increases the magnetic flux leakage. The shape and magnitude of the magnetic flux is analyzed using sophisticated computer algorithms to determine the amount of pipe wall loss and to discriminate external corrosion features from internal corrosion features.

In embodiments disclosed herein, when electrons of the metal layer (195) of the buried pipeline (103) are excited by the transmitted GPR wave (190), a phenomenon called noise ringing is generated and detected by the GPR antenna (194). However, when the metal layer (195) of the buried pipeline (103) being magnetized due to the magnetic transmitter (188) of the scraper (105), an amplitude and a frequency of a received ringing noise signal (192c) may be different as compared to a non-magnetized buried pipeline (103) without any scraper (105). The UAV system (186) may process the received GPR wave (192a) and analyze the amplitude and frequency of the received GPR wave (192a) to locate and track the scraper (105) in real-time. A GPS of the UAV system (186) (shown in FIG. 2) may record the real-time determined location and the determined time-stamp and send it to the controller unit (184) using the network (196) that is similar to a network (520) described with regard to FIGS. 5A and 5B and the accompanying description. The embodiments disclosed herein may also be used to calculate a real-time velocity of the scraper (105) by recording several real-time locations of the scraper (105) with time stamps from the GPS of the UAV system (186). In some embodiments, the control system (126), the logging system (112), or the reservoir simulator (160) may include a computer system.

Other embodiments may provide the real-time locating and tracking movement of the scraper (105) in a non-metallic buried pipeline. In particular, the received GPR wave (192a) from the scraper (105) is analyzed for detecting the scraper which may pass a non-metallic body of the buried pipeline (103) for the continuous and real-time locating and tracking movement of the scrapers. In some embodiment, if the scraper (105) of the metallic buried pipeline (103) is not equipped with the magnetic transmitter (188), then the real-time detection of the scraper (105) may be based on analyzing the amplitude and a shape of the received GPR wave (192a) which may have a different signature as compared to the received GPR wave (192a) due to a media filling the buried pipeline (103).

Figure 2:
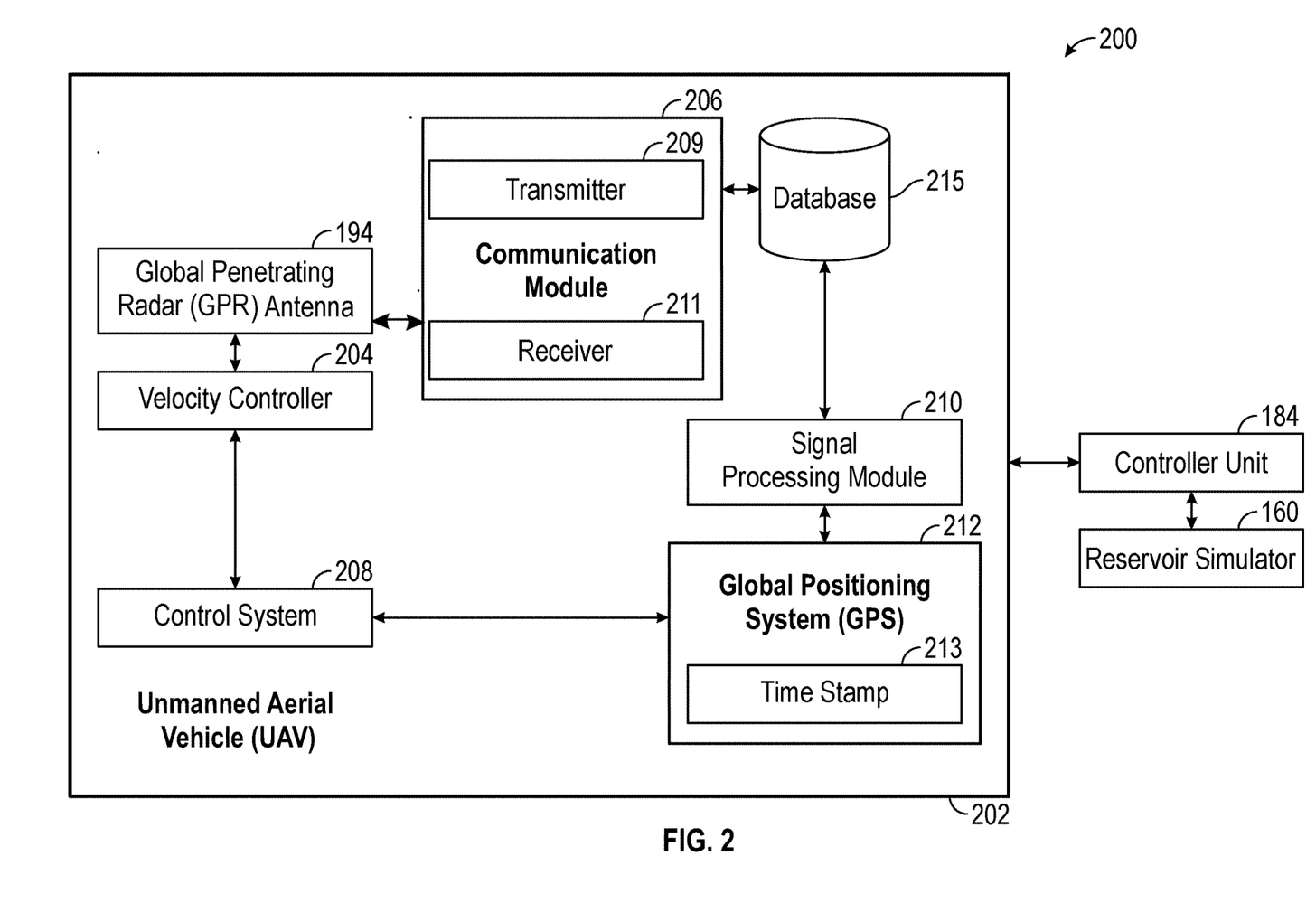
FIG. 2 shows a block diagram of an unmanned aerial vehicle (UAV) system in accordance with one or more embodiments.

Turning to FIG. 2, FIG. 2 illustrates a block diagram of an UAV system (200) in accordance with one or more embodiments. Specifically, FIG. 2 shows major components of the UAV system (200) that is used for continuous and real-time locating and tracking movement of one or more scrapers (105) in the buried pipeline (103) shown in FIG. 1. In particular, the UAV system (200) includes an UAV (202) and the controller unit (184). The controller unit (184) may be further operatively connected to the reservoir simulator (160) described with regard to FIG. 1 and the accompanying description. Each of these components are discussed in detail below.

In some embodiments, the UAV (202) may include a velocity controller (204), a communication module (206), a control system (208), a signal processing module (210), a GPS (212), the GPR antenna (194), and a database (215). The UAV (202) is operatively connected to the controller unit (184), used for controlling different functions and operations of the UAV (202).

In one or more embodiments, the communication module (206) may include a transmitter (209) and a receiver (211) and may include an integrated circuit for connecting the UAV (202) to the controller unit (184) and the network (196) (as shown in FIG. 1) (for example, a local area network (LAN), a wide area network (WAN), such as the Internet, mobile network, or any other type of network) or to another device, such as another computing device. The communication module (206) may further include a camera or any suitable device (not shown) with a capability of transmitting and receiving images and/or videos.

In one or more embodiments, the velocity controller (204) controls one or more parameters and adaptively update the parameters in terms of the variations of the flight dynamics to improve flight performance and a velocity of the UAV (202). For example, the velocity controller (204) may receive instructions to adjust the velocity of the UAV (202) and the one or more parameters to match a real-time calculated velocity of the scrapers (105) in the buried pipeline (103) autonomously (for example, by a suitable computing system such as an onboard controller the control system (208) or the database (215)), semi-autonomously (for example, by the controller unit (184)), or manually (for example, by the operator (182)). The velocity controller (204) may receive the real-time calculated velocity determined by the reservoir simulator (160). The real-time calculated velocity of the scraper (105) is the calculated velocity of the scraper (105) with respect to a previous recorded location and a previous recorded time stamp of the scraper (105) in the buried pipeline (103) stored in the database (215) as described with regard to FIG. 4B and the accompanying description.

In one or more embodiments, the signal processing module (210) converts real world information such as radio frequency (RF) signals, typically of microwave frequencies, in the form of 0 s and 1 s by performing wide variety of signal processing and analysis operations to make it understandable and usable by the contemporary digital units of the UAV (202). For example, the signal processing module (210) may provide functions and applications to analyze, pre-process, and extract features from uniformly and non-uniformly sampled RF signals. The signal processing module (210) may can be used to improve transmission, storage efficiency and subjective quality and to also emphasize or detect components of interest in a measured signal by the UAV (202). In general, the signal processing module (210) might include filters (for example, analog (passive or active) or digital (FIR, IIR, frequency domain or stochastic filters, etc.)), signal compressors, digital signal processors (DSPs), samplers, and analog-to-digital converters for signal acquisition and reconstruction.

In some embodiments, the signal processing module (210) may analyze the received GPR wave (192a) reflected from the metal layer (195) of the buried pipeline (103) (as shown in FIG. 1) to obtain the amplitude and frequency of the reflected ringing noise signal (192c). In some embodiments, in case the buried pipeline (103) is non-metallic, the signal processing module (210) may analyze the received GPR wave (192a) that is sent by the scraper (105) which may pass the non-metallic body of the buried pipeline (103). In another embodiment, if the scraper (105) is not equipped with the metallic transmitter (188), then the signal processing module (210) may analyze the received GPR wave (192a) to obtain the amplitude and shape of the received GPR wave (192a). The extracted features (for example, amplitude, frequency, and shape) from the received GPR wave (192a) may be stored in the database (215) and/or may be sent to the GPS (212) to determine the location coordinates to locate and track the scraper (105) in the buried pipeline (103).

In one or more embodiments, the GPS (212) is a satellite-based radio-navigation system which plays an important role in the UAV (202) whether being guided autonomously or guided by the operator (182). The GPS (212) is the key to operating the UAV (202) safely. As long as sufficient satellite signals are accessed during the entire UAV system (200) mission, navigation techniques of the GPS (212) may offer consistent accuracy.

The most common use of the GPS (212) in the UAV (202) is navigation. In some embodiments, the GPS (212) is used in conjunction with an Inertial Navigation Systems (INS) (not shown), to offer more comprehensive UAV navigation solutions. The GPS (212) is used to determine the position of the one or more scrapers (105) in the buried pipeline (103). The relative positioning and speed of the scraper (105) are also usually determined by the GPS (212). The position provided by the controller unit (184) may be used to track the UAV (202), or, in combination with an automated guidance system (not shown) of the GPS (212), steer the UAV (202).

In general, an autonomous UAV usually rely on a position signal from the GPS which, combined with inertial measurement unit (IMU) data, provides highly precise information that can be implemented for control purposes. In order to avoid accidents in an area heavily populated by other UAV or manned vehicles, it is necessary to know exactly where the UAV is located at all times. Equipped with the GPS, the UAV may not only provide location and altitude information, but necessary vertical and horizontal protection levels.

In some embodiments, the UAV system (200) is often used for the real-time observation and measurements of one or more scrapers (105) in the buried pipeline (103) as shown in FIG. 1, making use of the cameras and GPRs installed for this very purpose. In order to accurately geographically reference collected data, it is important to know the exact position of the UAV (202) when a measurement or photo is taken. The GPS (212) may pinpoint the exact position of the UAV (202), often down to the centimeter. The same concept applies to the exact time at which the photo or measurement is taken. In some embodiments, the GPS (212) may include a time stamp (213) which may provide precise time stamps along with the location provided by the GPS (212) to track and collect invaluable information with regard to the scraper (105). For example, the real-time velocity of the scraper (105) may be calculated using the recorded several locations of the scraper (105) with time stamps.

In one or more embodiments, the GPR antenna (194) sends the transmitted GPR wave (190) to the soil-pipeline interface (193) for targeting the buried pipeline (103) shown in FIG. 1. The received GPR wave (192a) from the buried pipeline (103) may be reflected due to the soil-pipelines interface (193) and is a combination of a reflected GPR wave (192b) with a ringing noise signal (192c) from the scraper (105) as described in FIG. 1. The above-mentioned embodiment is applicable if the buried pipeline (103) is a metallic pipeline in which the reflection is due to the media filling the buried pipeline (103).

In an alternate embodiment, for a non-metallic buried pipeline (103), the received GPR wave (192a) penetrating a wall of the non-metallic pipeline and hitting the scraper (105) is analyzed for the continuous and real-time locating and tracking movement of the scrapers.

In general, the GPR is typically used for detecting objects or singular elements hidden in a homogeneous or quasi-homogeneous medium. According to scattering theory, the EM waves transmitted by the GPR antenna (194) are reflected by any dielectric singularity whose dimension results are greater than the wavelength, according to principles of geometrical optics. The reflections from this kind of target give additional peaks in the received GPR wave (192a) at the GPR antenna (214). GPR data are usually recorded from a number of spatial positions by dragging the GPR antennas (194) along the surface of the ground or walls. A transmit and receive occur at each of the observation positions. The recorded data are then combined to form an image called the radargram (shown in FIG. 3). The typical singularities that are detected using the GPR in some applications are buried objects (for example, bars, utilities, and mines), voids, cracks, and separation of interfaces. Further details on the GPR and the GPR antenna are mentioned in description for FIG. 3.

Figure 3:
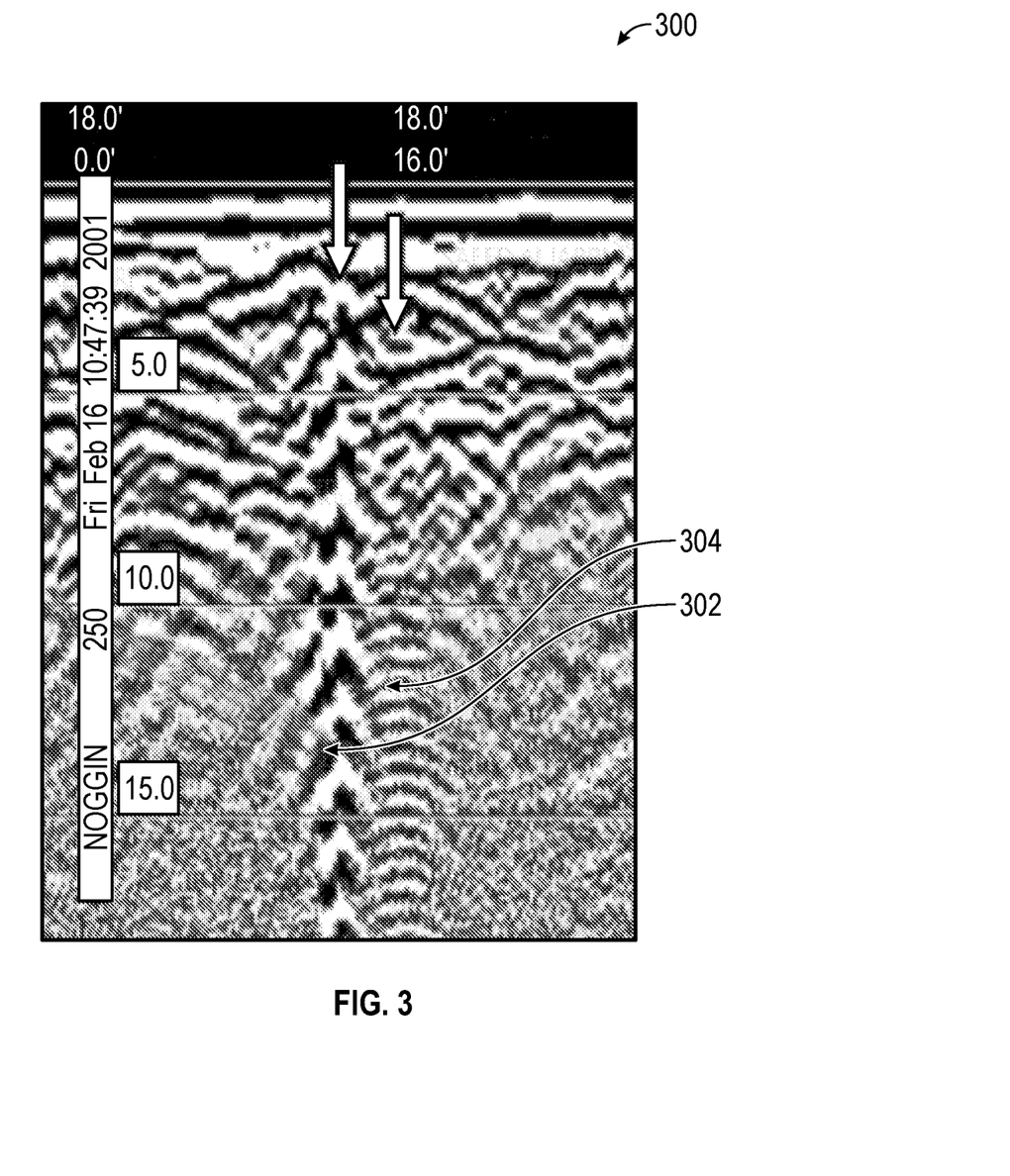
FIG. 3 shows an exemplary ringing noise signal radargram in accordance with one or more embodiments.

FIG. 3 shows an exemplary ringing noise signal radargram (300) in accordance with one or more embodiments. Specifically, FIG. 3 depicts that, for example, when the electrons of the metal layer (195) of the buried pipeline (103) are excited by the transmitted GPR wave (190), the phenomena called noise ringing is generated and is detected by the GPR antenna (194). This phenomenon of the noise ringing is observed as oscillated waves in the radargram (300) which are either a low frequency ringing noise signal (302) or a high frequency ringing noise signal (304).

In some embodiments, a ground penetrating radar (GPR) consists of a pulse transmitter and a receiver. The transmitter emits an impulse into the ground and the receiver immediately captures the (under) ground response. The reflected pulse arrives in the form of the EM wave with phase and amplitude variations. Wave changes the phase (represented by colors) only on permittivity or conductivity (or both) boundary. Interface properties, such as abrupt change (for example, rock to air) or gradual transition (for example, wet to dry sand), may be extracted from the shape of the EM wave. Therefore, the penetrated medium may be assessed. The wave may be displayed on computer screen real-time during the measurement. The wave record is represented by a narrow vertical data-column with amplitudes converted into colors; plotting these columns one after another forms a GPR section, the actual radargram. Basically, the radargram (300) is a color image into which the reflected signals are converted using preprocessing routine for enhancing the image readability. When the wave is propagated more slowly, single reflections thicken in vertical direction (and form stripes). Various filters are used then to point out specific structures in subsurface. The colors do not indicate specific materials or objects. Shapes of the reflection, a contrast and color intensity are important for interpretation of the radargram.

Reflections from significant objects (in terms of permittivity/conductivity, for example, metal objects, cavities, and tunnels) are depicted in the shape of a hyperbola with a vertex on top, which is caused by a wide antenna radiation pattern and a data logging method. Hyperbolic reflections do not originate in the high wave attenuation environment.

In some embodiments, the GPR antennas (194) transmit a signal not only to the ground, but also to the surrounding environment. Reflections from ground objects (fencing, poles and sticks, metal construction etc.) are called air and ground reflections. They are easy to identify in the radargrams (300). When approaching or moving away from the object, its reflection always forms a straight line. While passing the object, a protracted hyperbola arises. Those objects may be back-located in the terrain with the help of the recorded time of reflection and the calculated distance. It is also possible to partially filter them out from the radargram (300).

In some embodiments, a software may be used to process the radargram (300) and is equipped with various filters to emphasize target frequencies (for example, the low frequency ringing noise signal (302) and the high frequency ringing noise signal (304)) and disturbing ones may be suppressed. Multiple reflections may be eliminated, air reflections filtered out, etc. Such a processing helps to reveal minor changes in wave behavior and uncover insignificant, but important and deep-located objects.

Figure 4A:
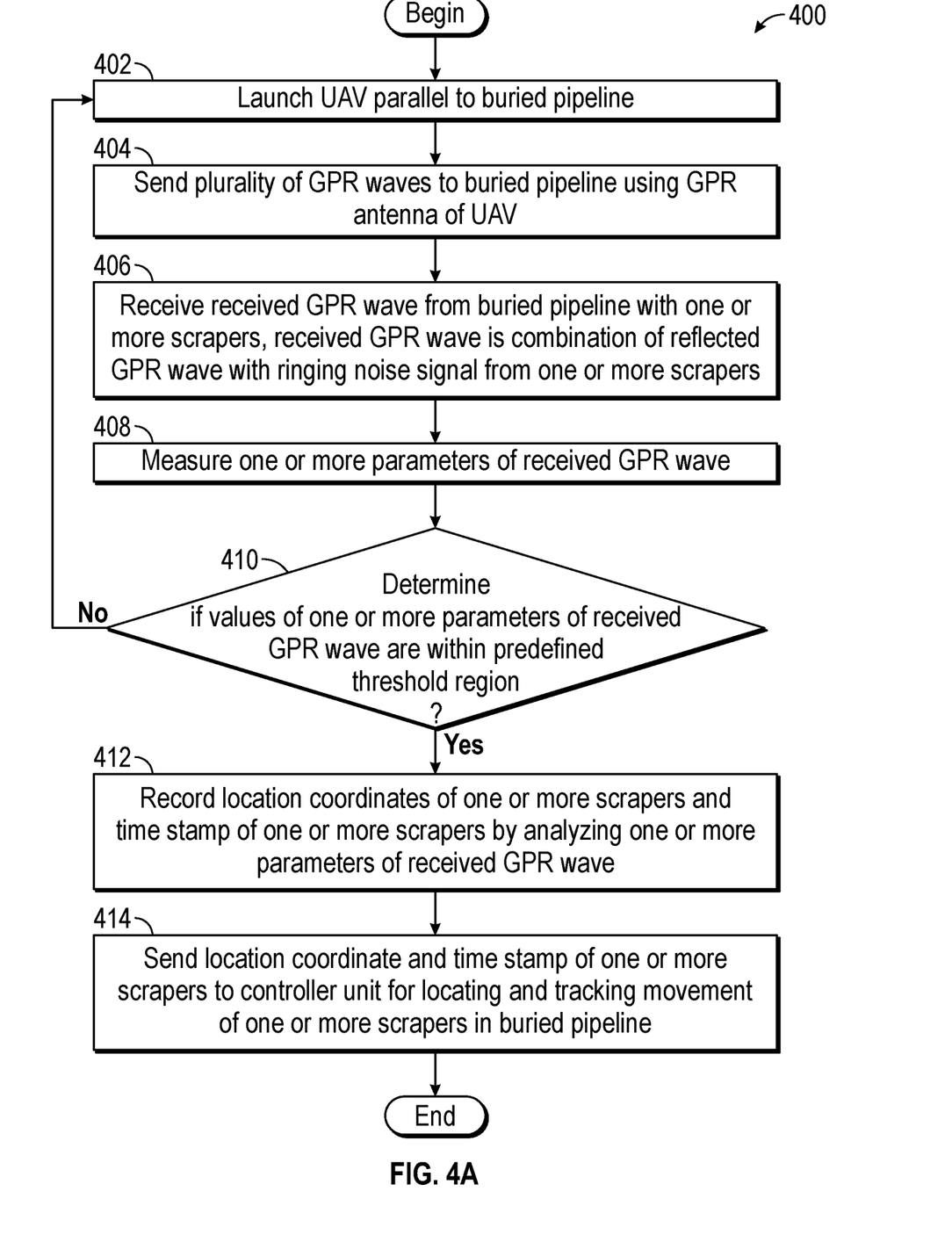
FIGS. 4A and 4B show flowcharts in accordance with one or more embodiments.

FIG. 4A shows a flowchart (400) in accordance with one or more embodiments. Specifically, FIG. 4 describes a general method for continuous and real-time locating and tracking the movement of the scrapers in the buried pipeline. One or more steps in FIG. 4A may be performed by one or more components (for example, buried pipeline (103), scraper (105), operator (182), controller unit (184), UAV system (186), magnetic transmitter (188), GPR antenna (194), and UAV (202) as described in FIGS. 1 and 2. While the various steps in FIG. 4 are presented and described sequentially, one of ordinary skill in the art will appreciate that some or all of the steps may be executed in different orders, may be combined, or omitted, and some or all of the steps may be executed in parallel. Furthermore, the steps may be performed actively or passively. The method may be repeated or expanded to support multiple components and/or multiple users within a field environment. Accordingly, the scope of the invention should not be considered limited to the specific arrangement of steps shown in the flowchart.

In step 402, a UAV is launched parallel to the buried pipeline in accordance with one or more embodiments. For example, the UAV (202) which includes the airframe structure with the GPR antenna (194) is launched parallel to the buried pipeline (103) by the operator (182) using the controller unit (184) described previously in FIGS. 1 and 2 and the accompanying description.

In step 404, a plurality of transmitted GPR waves are sent to the buried pipeline using a GPR antenna of UAV in accordance with one or more embodiments. For example, the operator (182) may maneuver the controller unit (184) to send the EM transmitted waves to the buried pipeline (103) using the transmitter (209) of the communication module (206) of the UAV (202). In particular, the controller unit (184) may instruct the GPR antenna (194) to send the transmitted GPR waves (190) as the EM transmitted waves to the underground towards the buried pipeline (103) and the transmitted GPR waves (190) are reflected as the received GPR wave (192a) due to the soil-pipeline interface (193) described previously in FIGS. 1 and 2 and the accompanying description.

In step 406, a received GPR wave is received from the buried pipeline with one or more scrapers in accordance with one or more embodiments. In particular, the received GPR wave (192a) is a combination of a reflected GPR wave (192b) with a ringing noise signal (192c) from the one or more scrapers (105). For example, the received GPR wave (192a) is received at the receiver (211) of the communication module (206) of the UAV (202) from the buried pipeline (103) with one or more scrapers (105). The reflected GPR wave (192b) is affected by a noise signal generated by the magnetic transmitter (188) of the scraper (105) which sends magnetic flux (MFL) or electromagnetic acoustic (EMAT) signals. When the electrons of the metal layer (195) of the buried pipeline (103) are excited by the transmitted GPR wave (190), the phenomena called noise ringing is generated and detected by the GPR antenna (194). When the metal layer (195) of the buried pipeline (103) is being magnetized due to the MFL or EMAT signals by the magnetic transmitter (188), the amplitude and the frequency of the reflected ringing noise signal (192c) may be different as compared to a non-magnetized buried pipeline without any scraper as described previously in FIGS. 1 and 2 and the accompanying description.

In step 408, one or more parameters of the received GPR wave are measured in accordance with one or more embodiments. For example, the signal processing module (210) of the UAV (202) may analyze the amplitude and frequency of the received GPR wave (192a) to locate and track the scraper (105) as described previously in FIGS. 1 and 2 and the accompanying description.

In step 410, a determination is made as to whether values of the one or more parameters of the received GPR wave are within a predefined threshold region in accordance with one or more embodiments. In step 412, if the values of the one or more parameters of the received GPR wave are within the predefined threshold region, location coordinates of the one or more scrapers and a time stamp of the one or more scrapers are recorded by analyzing one or more parameters of received GPR wave in accordance with one or more embodiments. In step 414, the location coordinates and the time stamp of the one or more scrapers are sent to a controller unit for the real-time locating and tracking movement of the one or more scrapers in the buried pipeline in accordance with one or more embodiments. For example, the GPS (212) of the UAV (202) may record the determined location and the determined time stamp in the database (215) of the UAV (202) by analyzing one or more parameters (for example, amplitude and frequency) of the received GPR wave (192a) and send the recorded location to the controller unit (184) of the UAV (202) as described previously in FIG. 2 and the accompanying description.

In one or more embodiments, if the scraper (105) is not equipped with the magnetic transmitter (188), then the determination of the location coordinates and timestamp may be based on analyzing the amplitude and shape as the parameters of the received GPR wave (192a) which may have a different signature compared to the received GPR wave (192a) due to the media filling the buried pipeline (103) as described previously in FIG. 1 and the accompanying description.

In some embodiments, several time stamped locations of the scraper (105) are recorded in the database (215) of the UAV (202) using the time stamp (213) of the GPS (212) by analyzing one or more parameters of received GPR wave (192a) as described previously in FIGS. 1 and 2 and the accompanying description.

However, if the values of the one or more parameters of the received GPR wave are not within the predefined threshold region, the steps 402-410 are repeated until the values of the one or more parameters of the received GPR wave (192a) are within the predefined threshold region in accordance with one or more embodiments. The above-mentioned steps are applicable, if the buried pipeline (103) is a metallic pipeline in which the reflection is due to the media filling the buried pipeline (103).

In an alternate embodiment, if the buried pipeline is a non-metallic pipeline, the received GPR wave penetrating a wall of the non-metallic pipeline and hitting the one or more scrapers is analyzed for the continuous and real-time locating and tracking movement of the one or more scrapers in accordance with one or more embodiments. For example, for a non-metallic buried pipeline (103), the received GPR wave (192a) penetrating a wall of the non-metallic pipeline and hitting the scraper (105) is analyzed for the continuous and real-time locating and tracking movement of the scrapers.

Figure 4B:
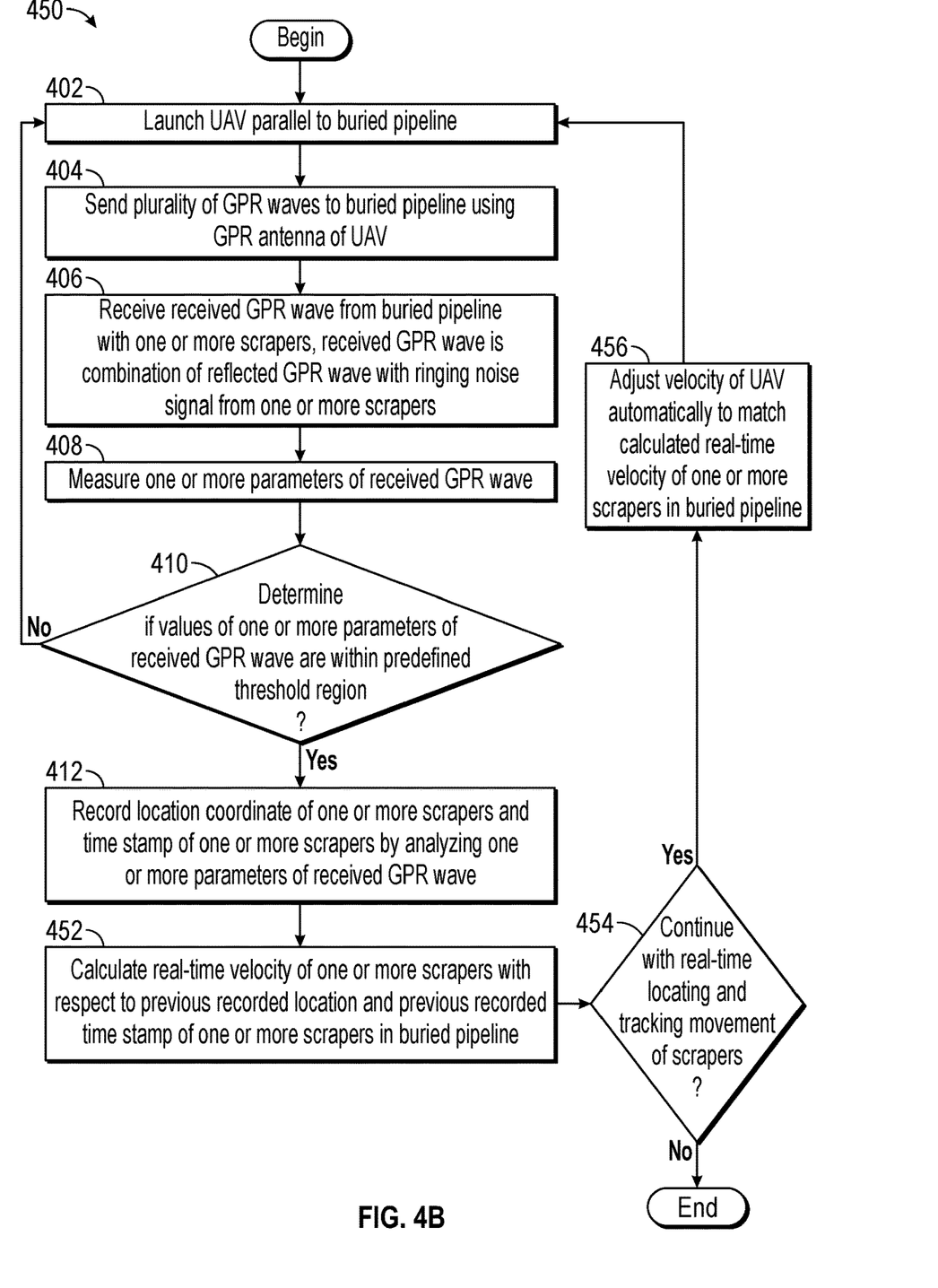

FIG. 4B shows a flowchart (450) in accordance with one or more embodiments. Specifically, FIG. 4B describes a general method for continuous and real-time locating and tracking the movement of the scrapers in the buried pipeline by calculating the velocity of the scraper. One or more steps in FIG. 4B may be performed by one or more components (for example, steps 402-412) as described in FIG. 4A. While the various steps in FIG. 4B are presented and described sequentially, one of ordinary skill in the art will appreciate that some or all of the steps may be executed in different orders, may be combined or omitted, and some or all of the steps may be executed in parallel. Furthermore, the steps may be performed actively or passively. The method may be repeated or expanded to support multiple components and/or multiple users within a field environment. Accordingly, the scope of the invention should not be considered limited to the specific arrangement of steps shown in the flowchart.

In step 452, a real-time velocity of the one or more scrapers is calculated with respect to a previous recorded location and a previous recorded time stamp of the one or more scrapers in the buried pipeline in accordance to one or more embodiments. In particular, the real-time velocity of the scraper (105) may be calculated by recording several locations of the scraper (105) with time stamped. For example, the real-time velocity of the scraper (105) with respect to the previous recorded location and time stamp $(X_0, T_0)$ of the scraper (105), stored in the database (215) of the UAV (202), is computed using the following equation:

$$\text{Real-time velocity} = \frac{X_1 - X_0}{T_1 - T_0} \quad (1)$$

In step 454, a determination is made as to whether continue with the real-time locating and tracking movement of scrapers in accordance with one or more embodiments. In step 456, if the real-time locating and tracking movement of the scraper is continued, a velocity of the UAV is adjusted automatically to match the calculated real-time velocity of the one or more scrapers in the buried pipeline in accordance to one or more embodiments. For example, on receiving the calculated real-time velocity, the controller unit (184) transmits instructions to adjust the velocity of the UAV (202) in the velocity controller (204) of the UAV (202) as described previously in FIG. 2 and the accompanying description. However, if the real-time locating and tracking movement of the scraper (105) is not continued, the calculated real-time velocity is stored in the database (215) of the UAV (202) for future reference. In some embodiments, the reservoir simulator (160) may continuously update the real-time velocity for the scraper (105) and enable the UAV (202) to determine the location and track movement of the scraper (105) by using determined locations and the determined time stamps.

Figure 5A:
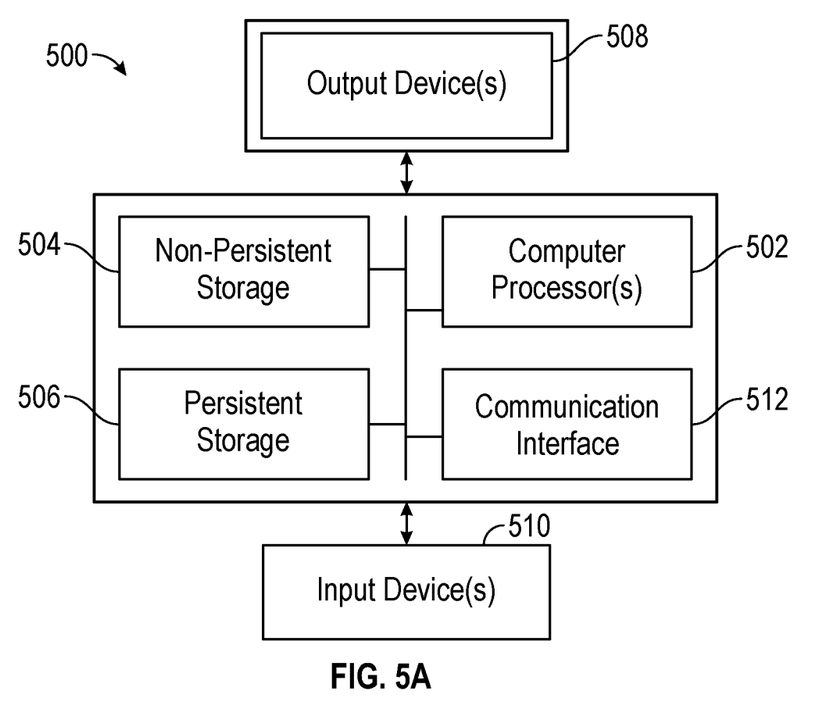
FIGS. 5A and 5B show a computing system in accordance with one or more embodiments.

One or more embodiments disclosed herein provide the continuous and real-time locating and tracking movement of the one or more scrapers in the buried pipeline using the UAV which may lead to at least one of the following advantages:

- a non-intrusive system with low maintenance cost
- intrusive sensors which do not interfere with flow profile and are not a source of leak
- continuous and real time measurement of location and tracking of the scraper
- determination of real-time velocity of the scraper Embodiments may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (for example, volatile memory, such as random access memory (RAM), cache memory), persistent storage (506) (for example, a hard disk, an optical drive such as a compact disk (CD) drive or digital versatile disk (DVD) drive, a flash memory), a communication interface (512) (for example, Bluetooth interface, infrared interface, network interface, optical interface), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, or electronic pen.

The communication interface (512) may include an integrated circuit for connecting the computing system (500) to a network (not shown) (for example, a local area network (LAN), a wide area network (WAN), such as the Internet, mobile network, or any other type of network) or to another device, such as another computing device.

Further, the computing system (500) may include one or more output devices (508), such as a screen (for example, a liquid crystal display (LCD), a plasma display, touchscreen, cathode ray tube (CRT) monitor, or projector), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s) is configured to perform one or more embodiments of the disclosure.

Figure 5B:
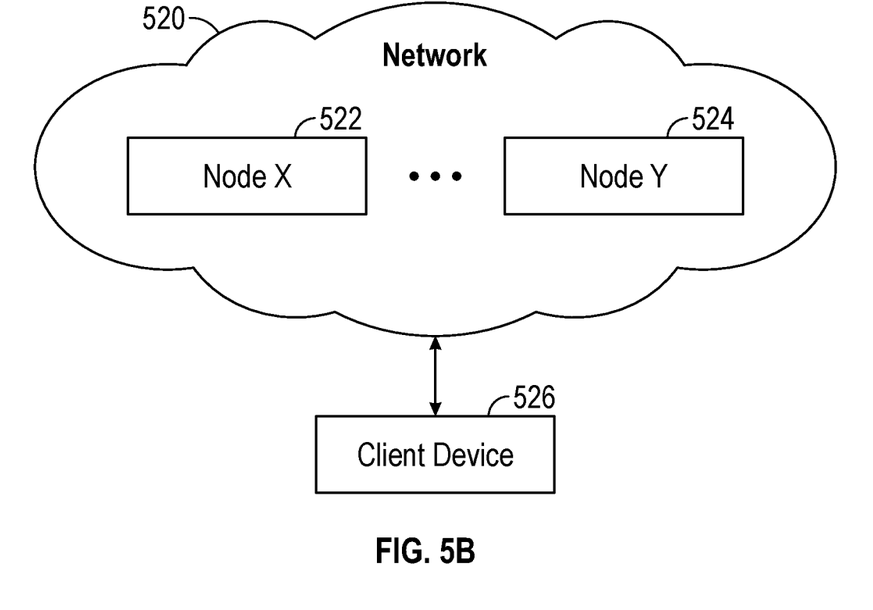

The computing system (500) in FIG. 5A may be connected to or be a part of a network. For example, as shown in FIG. 5B, the network (520) may include multiple nodes (for example, node X (522), node Y (524)). Each node may correspond to a computing system, such as the computing system shown in FIG. 5A, or a group of nodes combined may correspond to the computing system shown in FIG. 5A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory or resources.

The nodes (for example, node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include or perform all or a portion of one or more embodiments of the disclosure.

The computing system or group of computing systems described in FIGS. 5A and 5B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided in subsequent paragraphs.

Based on the client-server networking model, sockets may serve as interfaces or communication channel endpoints enabling bidirectional data transfer between processes on the same device. Foremost, following the client-server networking model, a server process (for example, a process that provides data) may create a first socket object. Next, the server process binds the first socket object, thereby associating the first socket object with a unique name or address. After creating and binding the first socket object, the server process then waits and listens for incoming connection requests from one or more client processes (for example, processes that seek data). At this point, when a client process wishes to obtain data from a server process, the client process starts by creating a second socket object. The client process then proceeds to generate a connection request that includes at least the second socket object and the unique name or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (for example, bytes).

Shared memory refers to the allocation of virtual memory space in order to substantiate a mechanism for which data may be communicated or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

The computing system of FIG. 5A may include functionality to present raw or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, for example, data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, for example, by obtaining data from a data attribute within the data object that identifies the data object type. Then, the GUI may determine any rules designated for displaying that data object type, for example, rules specified by a software framework for a data object class or according to any local parameters defined by the GUI for presenting that data object type. Finally, the GUI may obtain data values from the particular data object and render a visual representation of the data values within a display device according to the designated rules for that data object type.

The previous description of functions presents only a few examples of functions performed by the computing system of FIG. 5A and the nodes or client device in FIG. 5B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed. Accordingly, the scope of the disclosure should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method comprising:
   (a) launching, using a computer processor, an unmanned aerial vehicle (UAV) parallel to a buried pipeline;
   (b) sending, using the computer processor, a plurality of transmitted ground penetrating radar (GPR) waves to the buried pipeline using a GPR antenna of the UAV;
   (c) receiving, using the computer processor, a received GPR wave from the buried pipeline with one or more scrapers, wherein the received GPR wave is a combination of a reflected GPR wave with a ringing noise signal from the one or more scrapers;
   (d) measuring, using the computer processor, one or more parameters of the received GPR wave;
   (e) determining, using the computer processor, if values of the one or more parameters of the received GPR wave are within a predefined threshold region;
   (f) recording, using the computer processor, location coordinates of the one or more scrapers and a time stamp of the one or more scrapers by analyzing the one or more parameters of the received GPR wave if the values of the one or more parameters of the received GPR wave are within the predefined threshold region; and
   (g) sending the location coordinates and the time stamp of the one or more scrapers, using the computer processor, to a controller unit for continuous and real-time locating and tracking movement of the one or more scrapers in the buried pipeline,
   wherein, if the buried pipeline is a metallic pipeline, steps (a)-(e) are repeated until the values of the one or more parameters of the received GPR wave are within the predefined threshold region, and
   wherein, if the buried pipeline is a non-metallic pipeline, a received GPR wave penetrating a wall of the non-metallic pipeline and hitting the one or more scrapers is analyzed for the continuous and real-time locating and tracking movement of the one or more scrapers.

2. The method of claim 1, further comprising calculating, using the computer processor, a real-time velocity of the one or more scrapers with respect to a previous recorded location and a previous recorded time stamp of the one or more scrapers in the buried pipeline.

3. The method of claim 2, further comprising adjusting, using the computer processor, a velocity of the UAV automatically to match the calculated real-time velocity of the one or more scrapers in the buried pipeline.

4. The method of claim 1, wherein the one or more scrapers are located and tracked based on analyzing the ringing noise signal that is reflected by the one or more scrapers and the ringing noise signal is detected by the GPR antenna of the UAV.

5. The method of claim 1, wherein a determined location and a determined time stamp of the one or more scrapers are recorded by a global positioning system (GPS) of the UAV and are sent to the controller unit.

6. The method of claim 1, wherein:
   if the one or more scrapers are equipped with the magnetic transmitter, then an amplitude of the received GPR wave and a frequency of the received GPR wave are at least measured as the one or more parameters of the received GPR wave, and
   the received GPR wave is affected by the ringing noise signal generated by the magnetic transmitter which sends at least one of magnetic flux leakage (MFL) signals or electromagnetic acoustic transducer (EMAT) signals to magnetize a metallic layer of the buried pipeline.

7. The method of claim 6, wherein:
   if the one or more scrapers are not equipped with the magnetic transmitter, then an amplitude of the received GPR wave and a shape of the received GPR wave are at least measured as the one or more parameters of the received GPR wave, and
   a signature of the received GPR wave without the magnetic transmitter is different compared to a signature of the received GPR wave with an EM sensor due to a media filling the buried pipeline.

8. A system, comprising:
a buried pipeline with one or more scrapers;
an unmanned aerial vehicle (UAV) system comprising:
   an UAV; and
   a controller unit coupled to the UAV,
   wherein the UAV comprises:
      a ground penetrating radar (GPR) antenna,
      a global positioning system (GPS),
      a signal processing module coupled to a database,
      a communication module,
      a control system, and
      a velocity controller, and
a reservoir simulator operatively connected to the controller unit and comprising a computer processor configured to execute a method for continuous and real-time locating and tracking movement of the one or more scrapers in the buried pipeline, comprising:
   (a) launch the UAV parallel to the buried pipeline;
   (b) send a plurality of transmitted GPR waves to the buried pipeline using the GPR antenna of the UAV;
   (c) receive a received GPR wave from the buried pipeline with the one or more scrapers, wherein the received GPR wave is a combination of a reflected GPR wave with a ringing noise signal from the one or more scrapers;
   (d) measure one or more parameters of the received GPR wave;
   (e) determine if values of the one or more parameters of the received GPR wave are within a predefined threshold region;
   (f) record location coordinates of the one or more scrapers and a time stamp of the one or more scrapers by analyzing the one or more parameters of the received GPR wave if the values of the one or more parameters of the received GPR wave are within the predefined threshold region; and
   (g) send the location coordinates and the time stamp of the one or more scrapers to the controller unit for the continuous and real-time locating and tracking movement of the one or more scrapers in the buried pipeline,
   wherein, if the buried pipeline is a metallic pipeline, steps (a)-(e) are repeated until the values of the one or more parameters of the received GPR wave are within the predefined threshold region, and
   wherein, if the buried pipeline is a non-metallic pipeline, a received GPR wave penetrating a wall of the non-metallic pipeline and hitting the one or more scrapers is analyzed for the continuous and real-time locating and tracking movement of the one or more scrapers.

9. The system of claim 8, wherein the one or more scrapers include a magnetic transmitter.

10. The system of claim 9, wherein the magnetic transmitter sends at least one of magnetic flux leakage signals or EM acoustic transducer (EMAT) signals to magnetize a metallic layer of the buried pipeline.

11. The system of claim 8, wherein the reservoir simulator is further configured to calculate a real-time velocity of the one or more scrapers with respect to a previous recorded location and a previous recorded time stamp of the one or more scrapers in the buried pipeline.

12. The system of claim 11, wherein the reservoir simulator is further configured to adjust a velocity of the UAV automatically to match the calculated real-time velocity of the one or more scrapers in the buried pipeline.

13. The system of claim 8, wherein the communication module of the UAV further comprises a transmitter and a receiver.

14. The system of claim 8, wherein a determined location and a determined time stamp of the one or more scrapers are recorded by the GPS of the UAV and are sent to the controller unit.

15. A non-transitory computer readable medium storing instructions executable by a computer processor, the instructions comprising functionality for:
   (a) launching an unmanned aerial vehicle (UAV) parallel to a buried pipeline;
   (b) sending a plurality of transmitted ground penetrating radar (GPR) waves to the buried pipeline using a GPR antenna of the UAV;
   (c) receiving a received GPR wave from the buried pipeline with one or more scrapers, wherein the received GPR wave is a combination of a reflected GPR wave with a ringing noise signal from the one or more scrapers;
   (d) measuring one or more parameters of the received GPR wave;
   (e) determining if values of the one or more parameters of the received GPR wave are within a predefined threshold region;
   (f) recording location coordinates of the one or more scrapers and a time stamp of the one or more scrapers by analyzing the one or more parameters of the received GPR wave if the values of the one or more parameters of the received GPR wave are within the predefined threshold region; and
   (g) sending the location coordinates and the time stamp of the one or more scrapers to a controller unit for continuous and real-time locating and tracking movement of the one or more scrapers in the buried pipeline,
   wherein, if the buried pipeline is a metallic pipeline, steps (a)-(e) are repeated until the values of the one or more parameters of the received GPR wave are within the predefined threshold region, and
   wherein, if the buried pipeline is a non-metallic pipeline, a received GPR wave penetrating a wall of the non-metallic pipeline and hitting the one or more scrapers is analyzed for the continuous and real-time locating and tracking movement of the one or more scrapers.

16. The non-transitory computer readable medium of claim 15, wherein the instructions further comprise functionality for calculating a real-time velocity of the one or more scrapers with respect to a previous recorded location and a previous recorded time stamp of the one or more scrapers in the buried pipeline.

17. The non-transitory computer readable medium of claim 16, wherein the instructions further comprise functionality for adjusting a velocity of the UAV automatically to match the calculated real-time velocity of the one or more scrapers in the buried pipeline.

18. The non-transitory computer readable medium of claim 15, wherein the instructions further comprise functionality for locating and tracking the one or more scrapers based on analyzing the ringing noise signal, detected by the GPR antenna of the UAV, that is reflected by the one or more scrapers and passes a non-metallic body of the buried pipeline.

19. The non-transitory computer readable medium of claim 15, wherein:

if the one or more scrapers are equipped with a magnetic transmitter, then an amplitude of the received GPR wave and a frequency of the received GPR wave are at least measured as the one or more parameters of the received GPR wave, and the received GPR wave is affected by the ringing noise signal generated by the magnetic transmitter which sends at least one of magnetic flux leakage (MFL) signals or electromagnetic acoustic transducer (EMAT) signals to magnetize a metallic layer of the buried pipeline.

20. The non-transitory computer readable medium of claim 19, wherein:

if the one or more scrapers are not equipped with the magnetic transmitter, then an amplitude of the received GPR wave and a shape of the received GPR wave are at least measured as the one or more parameters of the received GPR wave, and a signature of the received GPR wave without the magnetic transmitter is different compared to a signature of the received GPR wave with an EM sensor due to a media filling the buried pipeline.

\* \* \* \* \*